(12) United States Patent
Pandorf

(10) Patent No.: US 6,827,389 B1
(45) Date of Patent: Dec. 7, 2004

(54) REMOVABLE COVER

(76) Inventor: Brian Pandorf, 12424 Flint Creek Rd., Thonotosassa, FL (US) 33592

( * ) Notice: Subject to any disclaimer, the term of this patent is extended or adjusted under 35 U.S.C. 154(b) by 0 days.

(21) Appl. No.: 10/657,012

(22) Filed: Sep. 8, 2003

(51) Int. Cl.[7] .................................................. B60P 7/02
(52) U.S. Cl. ............................ 296/100.02; 299/100.09; 299/100.06
(58) Field of Search ........................ 296/100.02, 100.06, 296/100.07, 100.09, 100.17, 100.01, 37.6, 213, 209

(56) References Cited

U.S. PATENT DOCUMENTS

| | | | | |
|---|---|---|---|---|
| 4,313,636 A | * | 2/1982 | Deeds ................... | 296/100.09 |
| 4,418,954 A | * | 12/1983 | Buckley ................. | 296/100.09 |
| 4,518,194 A | * | 5/1985 | Kirkham et al. ....... | 296/100.18 |
| 4,813,735 A | | 3/1989 | Avitable | |
| 4,832,394 A | * | 5/1989 | Macomber ............. | 296/100.06 |
| 4,943,194 A | | 7/1990 | Aguilar | |
| 5,427,428 A | * | 6/1995 | Ericson et al. ......... | 296/100.09 |
| 5,636,893 A | * | 6/1997 | Wheatley et al. ...... | 296/100.07 |
| 5,653,491 A | * | 8/1997 | Steffens et al. ........ | 296/100.09 |
| 5,961,173 A | * | 10/1999 | Repetti .................. | 296/100.09 |
| 6,059,350 A | * | 5/2000 | Kooiker ................. | 296/100.09 |
| 6,126,225 A | * | 10/2000 | Griffin ................... | 296/100.02 |
| 6,126,226 A | * | 10/2000 | Wheatley ............... | 296/100.17 |
| 6,129,407 A | * | 10/2000 | Kooiker ................. | 296/100.09 |
| 6,170,900 B1 | * | 1/2001 | Kooiker ................. | 296/107.09 |
| 6,176,541 B1 | | 1/2001 | Hoff | |
| 6,224,138 B1 | | 5/2001 | Adsit | |
| 6,227,602 B1 | * | 5/2001 | Bogard .................. | 296/100.06 |
| 6,352,296 B1 | * | 3/2002 | Kooiker ................. | 296/100.06 |
| 6,422,635 B1 | | 7/2002 | Steffens | |
| 6,439,639 B1 | | 8/2002 | Branting | |
| 6,527,326 B2 | * | 3/2003 | Henderson ............. | 296/100.09 |
| 6,527,330 B1 | * | 3/2003 | Steffens et al. ........ | 296/100.02 |
| 6,533,343 B2 | | 3/2003 | Bohm et al. | |
| 6,565,141 B1 | * | 5/2003 | Steffens et al. ........ | 296/100.09 |
| 6,702,359 B2 | * | 3/2004 | Armstrong et al. .... | 296/100.02 |
| 2002/0021019 A1 | | 2/2002 | Bohm | |

* cited by examiner

Primary Examiner—Kiran Patel
(74) Attorney, Agent, or Firm—Dennis G. LaPointe; Mason Law, P.L.

(57) ABSTRACT

A cover for the bed of a truck/trailer including a plurality of cover segments carried by and secured to a frame secured to the portion of the truck/trailer surrounding the bed. Each of the segments being secured to and overlying the frame and a trough is formed between adjoining segments to channel water away, with the trough passing through slots in the frame and extending beyond the same.

5 Claims, 4 Drawing Sheets

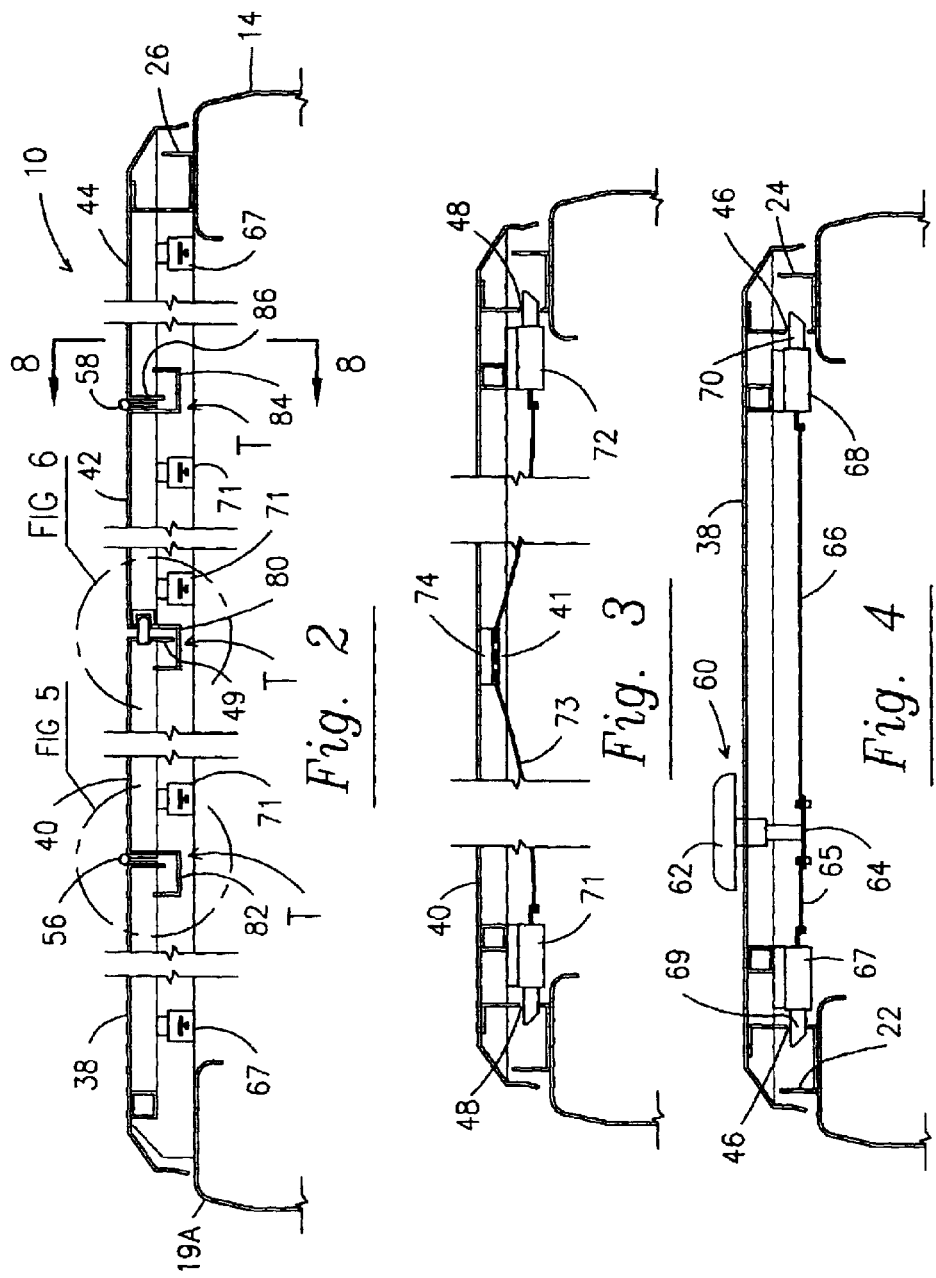

US 6,827,389 B1

REMOVABLE COVER

BACKGROUND OF THE INVENTION

1) Field of the Invention

This invention relates to removable covers for the bed of a truck or trailer which is composed of multiple segments and more particularly to such a cover having a drain arrangement between adjoining segments for draining rain overboard.

2) Description of the Prior Art

The great majority of pickup truck bed covers seen in use today are of the one piece, non segmented type. Segmented covers for the beds of trucks and trailers are well known in the prior art, however, none of them provide for adequate drainage for rain which may accumulate between adjoining segments, nor adequately provide for the discharge for such rain overboard from the vehicle, while providing for excellent securement of the adjoining segments to each other and to the vehicle.

SUMMARY OF THE INVENTION

The present invention provides an overlap between adjoining cover segments which serves as a trough for conducting rain or other water laterally and discharging the same overboard. The segments rest upon a peripheral frame, which frame has relieved areas to accommodate the passage there through of the troughs while the frame has openings therein in registration with laterally projecting securing means carried by the segments for locking the cover in place. Since the troughs conduct the water laterally and overboard, no extensive sealing arrangements are necessary between the adjoining segments.

BRIEF DESCRIPTION OF THE DRAWINGS

FIG. 2 is a longitudinal sectional view of the bed cover of FIG. 1 resting on the adjoining portion of the truck shown fragmentarily, FIG. 3 is a lateral sectional view taken through one of the middle segments of the cover at the location of the locking mechanism therefor;

FIG. 4 is a lateral sectional view taken through one of the end segments of the cover at the locatio of the locking mechanism therefor.

DETAILED DESCRIPTION OF THE PREFERRED EMBODIMENT

Figure 1:
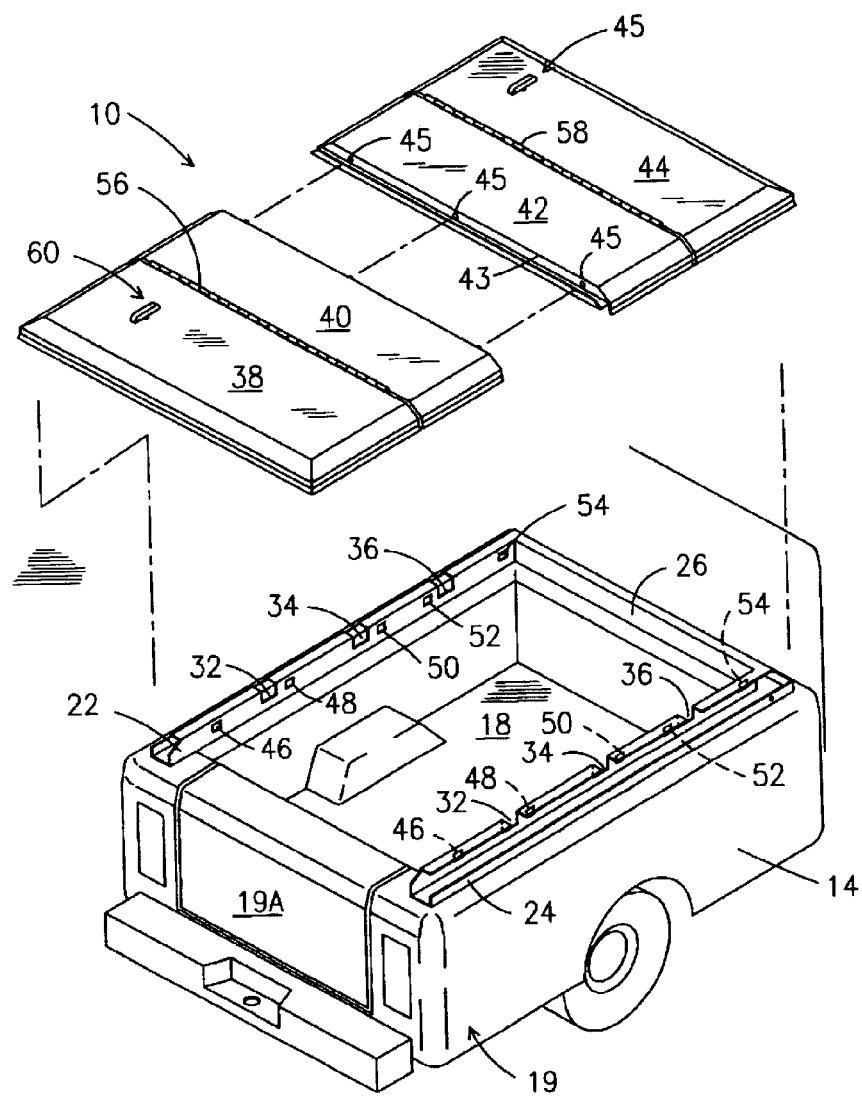
FIG. 1 is an exploded perspective view of the bed of a pickup truck with the bed cover spaced therefrom.
Figure 5:
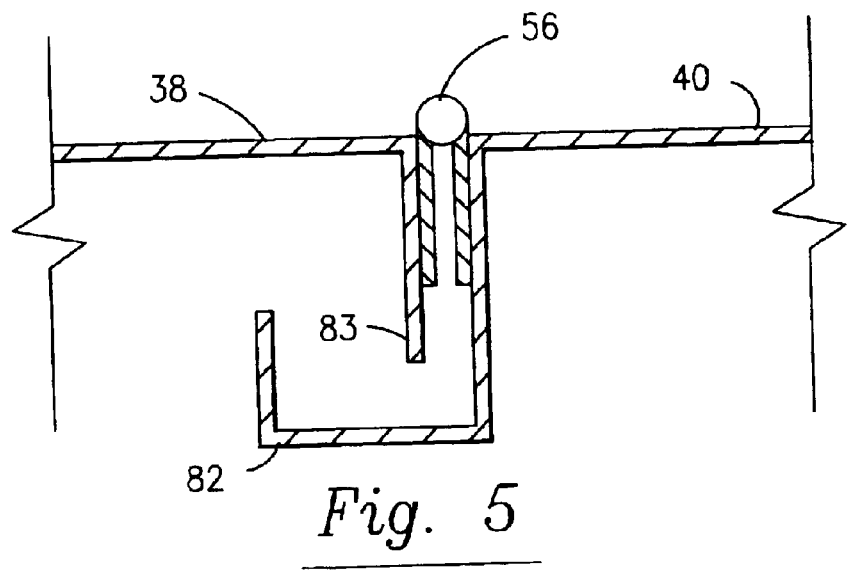
FIG. 5 is a fragmentary enlarged sectional view of the hinge area indicated on FIG. 2.
Figure 6:
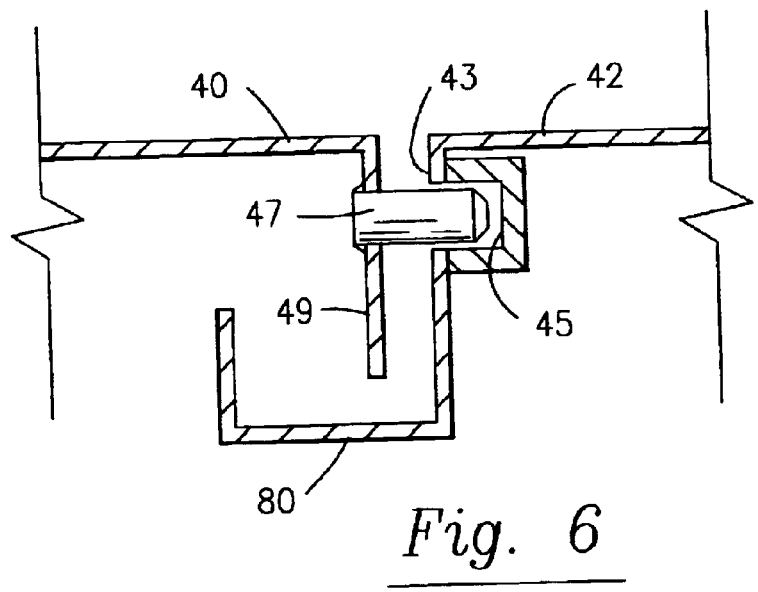
FIG. 6 is a fragmentary enlarged sectional view of the interlocking area indicated on FIG. 2.
Figure 7:
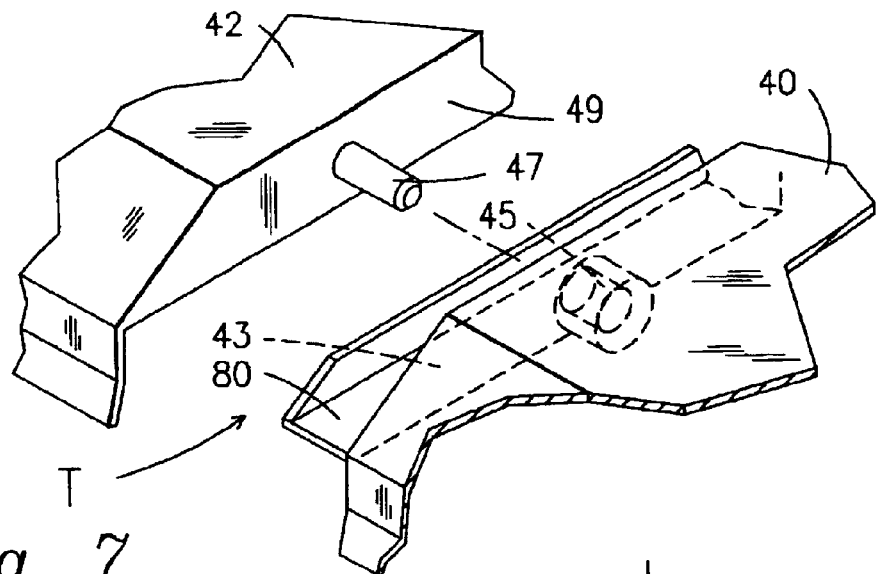
FIG. 7 is a fragmentary exploded perspective view of the area shown in FIG. 6.

Referring now to the drawings, a truck/trailer bed cover is shown at 10 and is adapted to be mounted on and secured to a peripheral frame 12, which in turn is securely secured to the top 13 of the laterally spaced sides 14 and the front 16 of the truck bed 18 of the truck 19 as by a plurality of peripherally spaced bolts 20. The frame 12 is comprised of three rail segments, a pair a laterally spaced segments 22 and 24, and a front segment 26. The segments 22, 24 and 26 are substantially "U" shaped in cross section with the outer leg 28 thereof being shorter than the inner leg 30 thereof, and with the inner leg 30 having a bent over lip 31 thereon; the leg 28 serving merely to provide rigidity to the frame 12, and the lip 31 also provides added rigidity and also a widened support surface as hereinafter described.. The side segments 22 and 24 each have three slots 32, 34 and 36 spaced there along; it being understood that more or fewer slots can be used depending on how many cover segments 38,40,42 and 44 are being utilized in the cover 10. The side segments 22 and 24 each have five lock holes 46, 48, 50, 52, and 54 spaced there along; it being understood that more or less lock holes can be used depending on how many cover segments 38, 40, 42 and 44 are being utilized.

The cover segment 38 is the rear segment of the cover 10, and the back edge thereof overlies the tailgate 19A of the truck 19. Segment 40 is immediately forward of segment 38, and is hinged thereto by a piano type hinge 56. The cover segment 44 is the forward most segment and its forward end overlies the front segment 26 of the frame 12, while the rear end of this cover segment is hinged to the forward end of cover segment 42 by a piano type hinge 58. Referring now to FIG. 4, the rear cover segment 38 includes a locking arrangement shown generally at 60 which includes a graspable handle 62 rotatably mounted in the segment 38, and secured at its lower end to a crank 64, the latter being secured by links 65 and 66 to spring loaded locks 67 and 68 respectively. The locks 67 and 68 include a locking pin 69 and 70, respectively, with the latter being cooperable with a lock hole 46 in the side frame segments 22 and 24 respectively. Thus, when the cover segment 38 is resting on the frame segments 22 and 24, the handle 62 can be rotated to allow the pins 69 and 70 to lock the cover segment 38 to the rail segments. The cover segment 40, which is hinged at its rear edge to the cover segment 38, can be raised and lowered relative thereto and, when in its lowered position seen in FIGS. 2 and 3, can be locked to the side segments 22 and 24 by a locking arrangement shown generally at 41 which includes a pair of spring loaded locks 71 and 72, the latter being cooperable with the lock hole 48 in the side segment 22 and 24 respectfully. The locks 71 and 72 are operated by a pull cable 73 connected at its outer ends to the locks and movably suspended at its center by a pillow block 74. When the cover segment 40 is lowered onto the side segments 22 and 24, the spring loaded locks are cammed into the openings 48 thereby locking the segment in place. When the lock 60 is actuated to allow the cover segment 38 to pivot upwardly on hinge 56, the operator can then reach under the cover segment 40 and grasp the pull cable 73 and operate the locking arrangement 41 to release the locks 71 and 72 so that the cover segment 40 can be removed along with the cover segment 38.

The cover segment 42 has a pair of spring loaded locking arrangements (not shown) which are identical to the locking arrangement 41 and which cooperate with the openings 50 and 52 in both of the side segments 22 and 24 to lock the cover segment in place when the cover segment is lowered onto the side segments 22 and 24. (The spring loaded locks 71 of these locking arrangements are shown in FIG. 2) While one locking arrangement 41 at this location would be operable and probably sufficient, a double locking arrangement is used to give an adequate level of safety and provide this segment as the key segment for affixing the cover 10 to the frame 12. The segment 42 is hinged to the forward cover segment 44 by the hinge 58 and the segment 44 has a locking arrangement 45, (not shown, except that the spring loaded lock of this locking arrangement is shown in FIG. 2) which is identical to the locking arrangement 60 on the cover segment 38. When the cover segment 44 is hinged upwardly, the operator can reach under the cover segment 42 to unlock the locking arrangements thereunder. The forward end of the cover segment 44 overlies the forward segment 26 of the frame 12. The cover segment 42 has a down turned wall 43 on the rear edge thereof and provided therein are three laterally spaced pocket openings 45 with sealed bottoms, with each receiving a pin 47 securely carried by the down turned wall 49 on the forward edge of the cover segment 40. The pin 47 and pocket openings 45 provide for a secure yet releaseable relationship between these two cover segments.

Figure 8:
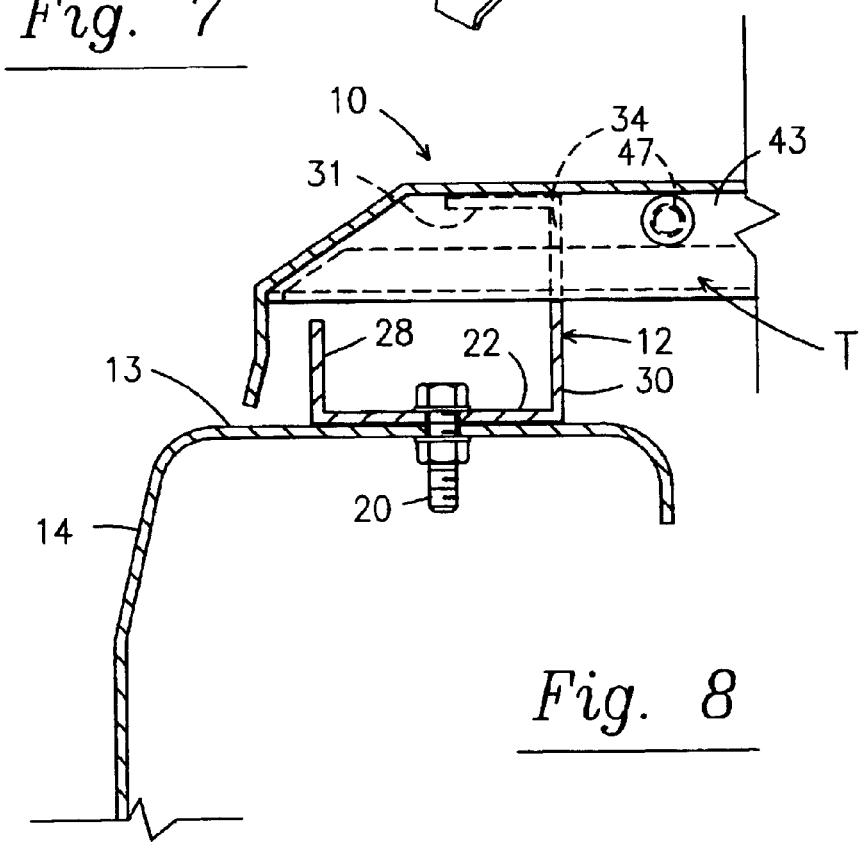
FIG. 8 is a fragmentary lateral sectional view taken along the lines 8—8 in FIG. 2.

Between the cover segments 38 and 40, between the cover segments 40 and 42 and between the cover segments 42 and 44 a trough "T" is provided to prevent rain or other water from leaking therebetween and onto the bed 18 of or contents of the trailer. Referring now to FIGS. 5, 6, 7 and 8, the down turned wall 43 on the cover segment 42 has an extension 80 with a generally "U" shaped configuration extending rearwardly therefrom and underlying the wall 49 to thereby form a trough "T" thereunder, which trough, as seen in FIG. 8, passes through the slot 34 in the leg 30 of the frame segment 22 and extends completely past the outer leg 28 of the frame. The bottom of the trough T rests on and is supported on the bottom of the slot. The opposite end of the trough T likewise passes through the opposite side of the frame 12.

Between the cover segments 38 and 40, a similar trough T includes an extension 82 carried by the back edge of the segment 40 underlying a wall 83 carried by the front end of the cover segment 38, and between the cover segments 42 and 44, a similar trough "T" includes an extension 84 carried by the front edge of the segment 42 underlying a wall 86 carried by the rear end of the cover segment 44. All three of these trough have the lateral ends thereof extending laterally beyond the outer side of the frame 12.

While only a single embodiment has been shown and described, it is readily apparent that changes can be made therein without departing from this invention as defined in the following claims.

What is claimed is:

1. A cover for the bed of a truck/trailer composed of a plurality of segments overlying said bed and overlying the portions of said truck/trailer surrounding the front, sides and back of said bed, comprising, A) a frame secured to and forming the top of the sides and front of the truck/trailer surrounding the bed thereof said frame including a pair of laterally spaced side members secured to the top of the sides of said bed and a front member secured to the top of the front of said bed and secured to both of said side members, B) a front, a back, and a pair of intermediate cover segments intermediate said front and back segments, with each of said segments overlying both of said side members, said front segment also overlying said front member, and said back segment also overlying the portion of said truck/trailer surrounding the back of said bed, C) said back segment and the rearmost of said intermediate segment being hinged together and said front segment and the most forward of said intermediate segment being hinged together, D) each of said segments including means for releaseably locking said segment to both of said side members, and
  1) a first trough means between said back segment and said intermediate member hinged thereto,
  2) a second trough means between said pair of intermediate segments, and
  3) a third trough means between said front segment and said intermediate hinged thereto, E) both of said side members include a plurality of slots and said trough means extend laterally and through said slots and beyond said side members.

2. A cover according to claim 1 wherein said intermediate segments include means for locking them together.

3. A cover according to claim wherein said locking means on said front and rear segments include an actuating means accessible from the outside of said segment.

4. A cover according to claim 3 wherein said locking means on each of said intermediate segments include an actuating means accessible from under said segment.

5. A cover according to claim 1 wherein each of said trough means includes a "U" shaped trough member carried by one of said segments and underlying a vertically extending wall formed on the adjacent one of said segments.

* * * * *